May 29, 1956 H. J. NOLL 2,747,493

HARROW DISK WITH KNOCKOUT CENTER

Filed Oct. 23, 1951

INVENTOR
HENRY J. NOLL

BY Young & Wright

ATTORNEYS

United States Patent Office 2,747,493

Patented May 29, 1956

2,747,493

HARROW DISK WITH KNOCKOUT CENTER

Henry J. Noll, Milwaukee, Wis.

Application October 23, 1951, Serial No. 252,649

1 Claim. (Cl. 97—217)

This invention appertains to harrow disks, and more particularly to a novel means for facilitating the placing of an implement on a shaft.

From time to time, it becomes necessary for farmers to replace one or more disks on their disk harrows, and as the shafts of harrows vary in size on different makes and styles, it is necessary for an implement dealer to carry an assortment of disks having different sizes of axial openings. It often happens that a disk having a certain size opening will be out of stock.

It is, therefore, one of the primary objects of my invention to provide a harrow disk having an opening therein for receiving a small size shaft and with means so-formed that portions of the disk can be readily snapped off by a forcible blow, for making a certain predetermined larger size opening for permitting the use of the same disk on a larger size shaft.

Another salient object of my invention is to provide means, whereby independent frangible lips will be formed on the walls of a disk opening whereby said lips can be quickly broken off to give a larger size shaft opening, the entire construction being such that irrespective of the size of the opening to harrow shaft, a firm shaft connection will be had to prevent turning of the disk on the shaft even after wear occurs.

With these and other objects in view, the invention consists in the novel construction, arrangement and formation of parts, as will be hereinafter more particularly described and claimed, and illustrated in the accompanying drawing, in which drawing, Figure 1 is a side elevational view of a harrow disk constructed in accordance with my invention.

Figure 1:
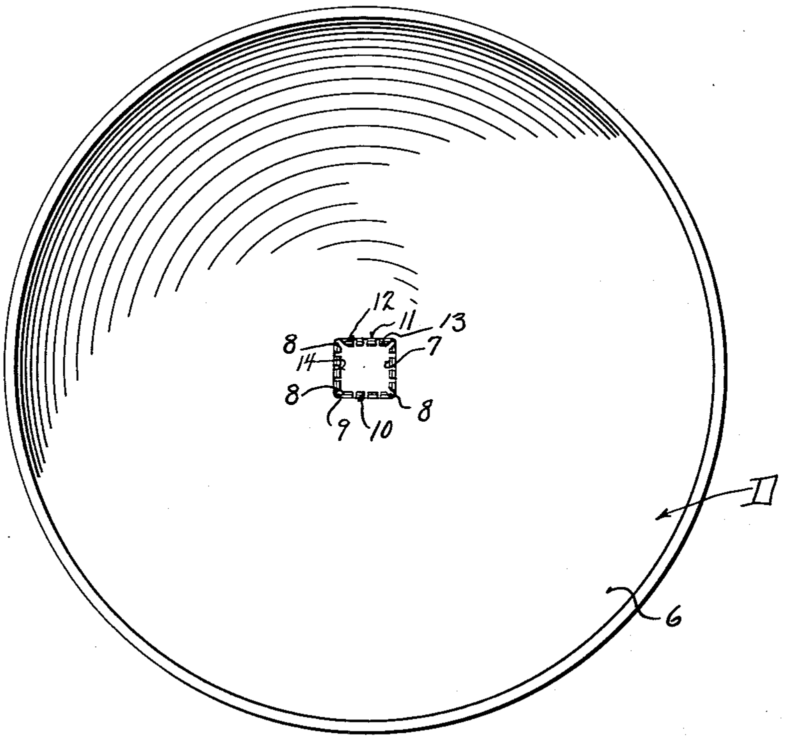

Referring to the drawing in detail, wherein similar reference characters designate corresponding parts throughout the several views, the letter D generally indicates my improved harrow disk and the same includes the usual metal body 6 having formed therein an axially disposed opening 7 of a square shape to receive a square shaped shaft of a certain size in cross section. In accordance with my invention, I provide at the corners of the opening 7 inwardly extending notches 8. The notches 8 open out into the opening 7, and it is to be noted that the inner walls of the notches 8 are rounded, as at 9, for a purpose which will later appear. By forming the notches 8, I provide lips 10 on the side walls of the opening 7, and in further accordance with my invention, I score or provide a fine line 11 at the juncture of the lips 10 with the body 6 of the disk. These fine score lines 11 can be either on one, or as shown, on both sides of the disk body, and the score lines extend to the curved inner walls 9, of the notches 8.

If desired, the lips themselves can be provided with fine score lines 12, and these lines also extend to the notches 8. By providing the score lines 12, I form breakable inner portions 13 on the lips 10.

Figures 2, 3, 5:
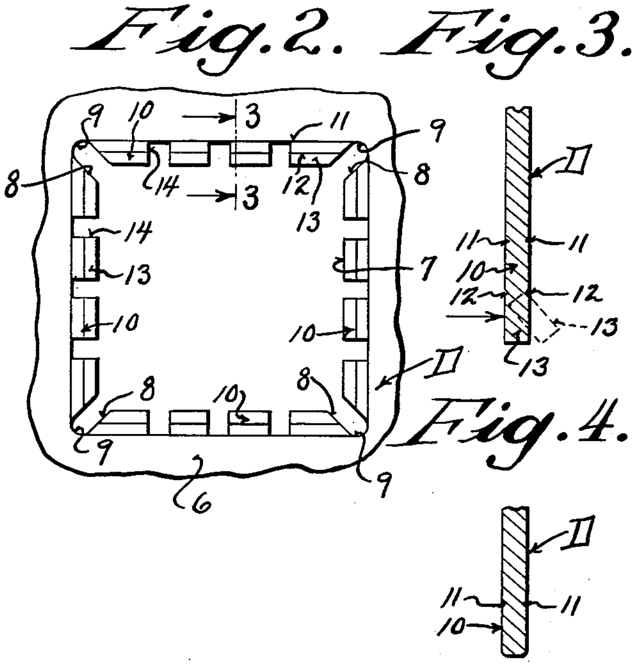
Figure 2 is an enlarged, fragmentary side elevational view, showing the novel formation of the shaft opening to permit larger sizes of openings to be had when necessary.
Figure 3 is a detail, sectional view taken on the line 3—3 of Figure 2, looking in the direction of the arrows and showing a portion of a lip of an opening being struck off.
Figure 5 is a view similar to Figure 2, and showing the inner portion of each lip struck off to give an intermediate size shaft opening.
Figure 4:
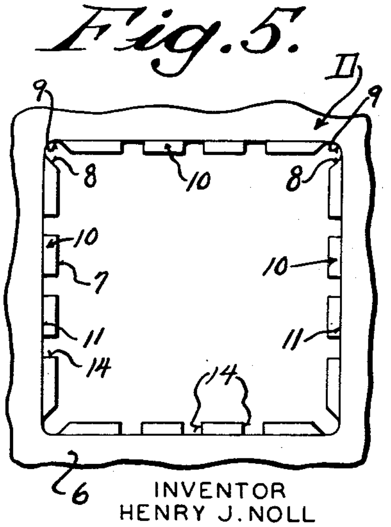
Figure 4 is a view similar to Figure 3, with the portion of the lip being entirely struck off.

As an example, of the use of my disk, the opening 7 can be of a size to receive a 15/16″ shaft. If the disk is to be fitted on a 1″ shaft, then the portions 13 are broken off the lips 10, by striking these portions a forcible blow and the lips will break off at the score lines 12, as shown in Figure 4. In Figure 5, the portions 13 of the lips 10 have been broken off and hence, the disk can be slid on a 1″ shaft.

If the disk is to be used on a 1⅛″ shaft, then the lips 10 are broken off from the body on the score lines 11 and the disk can then be readily fitted on the 1⅛″ shaft.

In order to facilitate the breaking off of the lips, the same can be provided with equidistantly spaced notches 14. These notches wil permit the breaking off of the lips in pieces or sections.

Great stress is laid on the formation of the lips and the fact that irrespective of the size of the opening, the major portion of the walls of the opening will engage the shaft so that tendency of the disk to turn on the shaft will be eliminated. By providing the round corners 9, danger of the body of the disk splitting during the forcible striking of the lips is obviated.

Changes in details may be made without departing from the spirit or the scope of this invention, but what I claim as new is:

A harrow disk comprising a body having an axial opening therein of a square shape, notches in the corners in the opening defining lips projecting equidistantly into the opening, said lips being divided from the body by fine lines opening into said corner notches, each of said lips having fine lines arranged in spaced parallel relation to the first fine lines and opening into said corner notches, and a plurality of equidistantly spaced notches in each lip arranged at right angles to the fine lines forming a plurality of independent breakable portions.

References Cited in the file of this patent

UNITED STATES PATENTS

| | | |
|---|---|---|
| 714,661 | Blaine | Dec. 2, 1902 |
| 880,302 | Heineman | Feb. 25, 1908 |
| 1,226,386 | Sackett | May 15, 1917 |
| 1,295,168 | Hooker | Feb. 25, 1919 |
| 1,328,787 | Bozard | Jan. 20, 1920 |
| 1,980,831 | Rosenfield | Nov. 13, 1934 |
| 2,357,754 | Moll | Sept. 5, 1944 |
| 2,406,553 | Mader | Aug. 27, 1946 |